July 27, 1965  W. N. JENSEN  3,196,692
SHAFT SUPPORT AND DAMPING MEANS FOR EDDY CURRENT INSTRUMENT
Filed Jan. 7, 1963
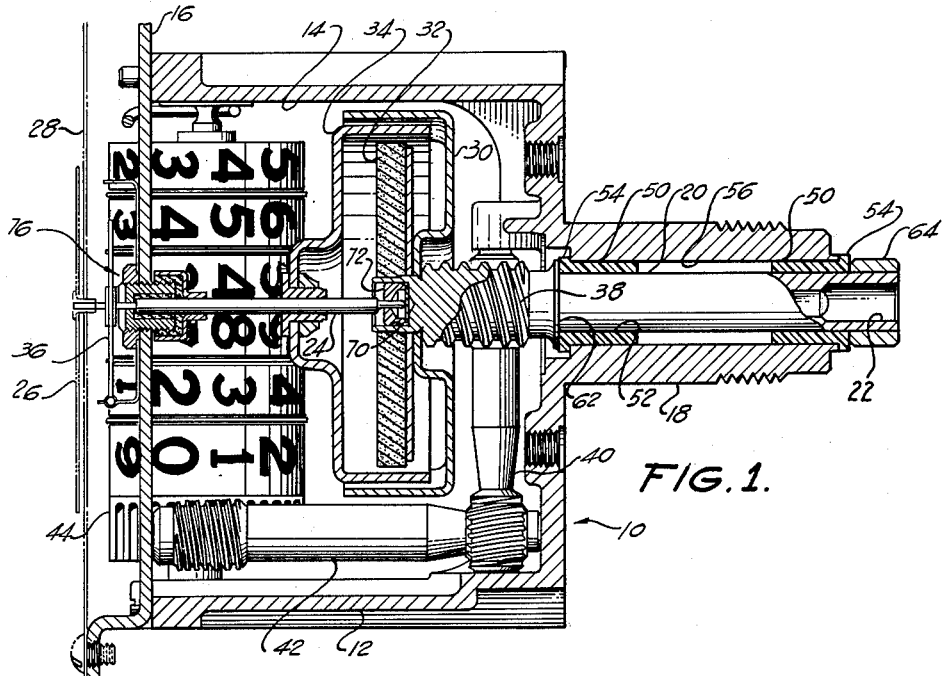
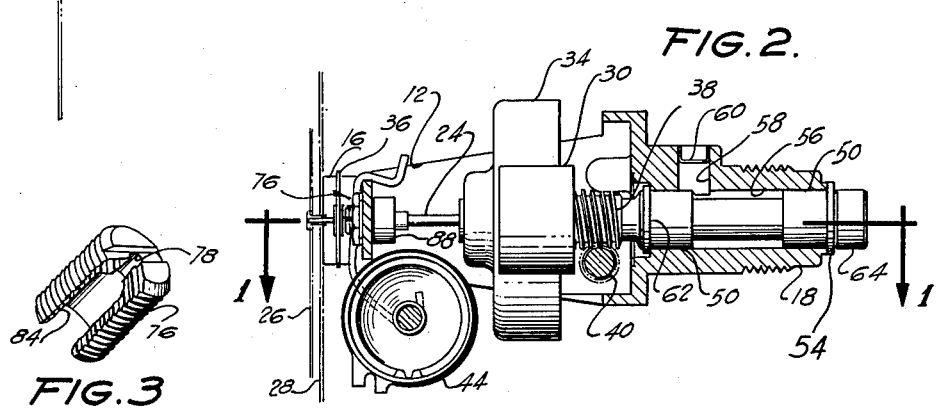
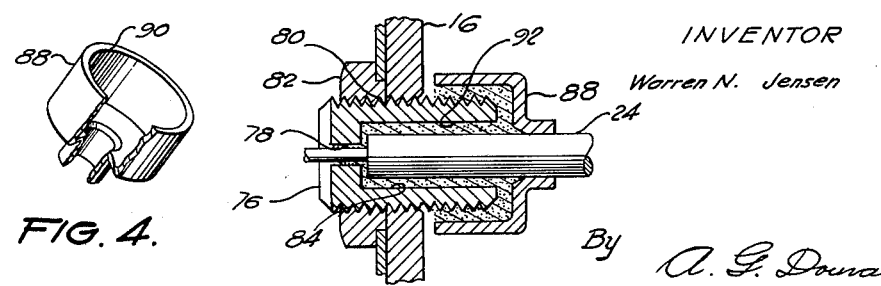
INVENTOR
Warren N. Jensen
By A. G. Douvas
Attorney

United States Patent Office

3,196,692
Patented July 27, 1965

3,196,692
SHAFT SUPPORT AND DAMPING MEANS
FOR EDDY CURRENT INSTRUMENT
Warren N. Jensen, Chicago, Ill., assignor to Stewart-Warner Corporation, Chicago, Ill., a corporation of Virginia
Filed Jan. 7, 1963, Ser. No. 249,714
7 Claims. (Cl. 73—496)

This invention relates to shaft support and damping means. More particularly, this invention relates to improved shaft support and damping means for the shafts of an eddy current instrument that permits sustained operation of the instrument with a minimum of maintenance, pointer oscillation, and fatigue-caused error or failure.

Frequently, eddy current instruments, such as speedometers, tachometers or the like, operate continuously without servicing in extreme ambient conditions, such as under severe vibrations, changing temperatures, and moisture or dust. Quite commonly, such an instrument fails in accuracy because of binding of poorly lubricated moving components, or fails in toto because of fatigue failure of a component. Also, under ambient vibrations, the pointer of the instrument commonly oscillates widely over its measured scale. This not only renders accurate reading of the pointer difficult if not impossible, but also causes increased friction wear and fatigue. Consequently, the instrument must either be serviced frequently or replaced.

Accordingly, the basic object of this invention is to provide improved shaft support and damping means operable to support the shafts of an eddy current instrument and the accompanying eddy current, elements, wherein sustained operation of the instrument is possible even under adverse ambient conditions.

Another object of this invention is to provide improved bearing means for the external drive shaft which form within themselves a natural reservoir for holding lubricant to permit sustained operation with little or no maintenance.

Another object of this invention is to provide improved damping means for the eddy driven shaft whereby oscillation is minimized or eliminated to permit truer reading of the shaft and to increase the service life of all components.

These and other objects will be more fully appreciated after a complete disclosure given in the specification including the accompanying drawing, wherein:

FIG. 1 is a sectional view, as seen generally from line 1—1 in FIG. 2, of an eddy current instrument having therein the improved shaft bearing and damping structure of the subject invention;

FIG. 2 is an elevation view, partly in longitudinal center section, of the instrument of FIG. 1;

FIG. 3 is a perspective view, partly broken away, of the bearing unit used in the subject invention;

FIG. 4 is a perspective view, partly broken away, of the damper member used in the subject invention; and FIG. 5 is an enlarged sectional view of the shaft damping means of FIG. 1.

The eddy current instrument shown in FIGS. 1 and 2 is generally of a conventional speedometer and odometer type. The instrument includes a frame 10 having cup-shaped side wall structure 12 defining an interior chamber 14 closed at its front end by a front plate 16. Hub 18 rotatably supports external drive shaft 20 having at its outer end a receiving bore 22 of conventional square contour adapted to receive in interlocking fashion the male insert, for example, of a flexible shaft (not shown). Eddy driven shaft 24 supports pointer 26 for movement across dial face 28. Eddy current elements 30, 32 and 34 are connected in appropriate fashion to the shafts 20 and 24 to form an eddy current torque transmission link between the two shafts. A hair spring 36 or the like between the frame 10 and the shaft 24 opposes rotation of the shaft 24 and pointer 26 from the zero scale position. Various transmission means including worm drive 38 on the shaft 20 and drive shafts 40 and 42 supported by the frame operate to connect the shaft 20 to an odometer 44 of conventional construction.

As thus far broadly described the eddy current instrument is a conventional instrument and operates in generally the same manner. Thus as shaft 20 is rotated externally responsive to operation of some physical element such as a transmission, engine or the like, the eddy current elements 30 and 32 secured to the shaft 20 rotate with the shaft about its center axis. The eddy current element 34 in spaced adjacent relationship to the eddy current elements 30 and 32 is thereby rotated in a like direction and with a particular torque against spring 38. Although deflection of shaft 24 depends on the various physical characteristics of the eddy current elements, generally, increased speed of shaft 20 increases the generated torque on shaft 24 to deflect the pointer 26 farther across the dial face 28.

In use, the frame 10 is supported in some appropriate manner on, for example, the instrument panel of a vehicle. Upon sustained operation, particularly under severe mechanical vibrations and adverse ambient conditions, the internal working of the eddy current instrument commonly would fail. The particular structure of the subject invention greatly minimizes or even eliminates these common defects to render a durable instrument requiring a minimum of maintenance.

It will be noted that the shaft 20 is supported by spaced annular bearing inserts 50. Each bearing insert 50 includes a generally smooth bore 52 which snugly but rotatably receives the shaft 20. The exterior dimension of the bearing insert 50 is such that it is press-fit in the bore of hub 18. Annular shoulder 54 limits the insertion of each bearing insert 50 to provide between the adjacent ends of the inserts an annular chamber or reservoir 56 surrounding the shaft 20. A passage 58 in the hub 18 communicates with the defined chamber 56 and thus provides a ready means for initially filling the chamber with a lubricant. Cap 60 in the passage 58 prevents leakage or infiltration of dirt into the chamber. Shoulder 62 on the shaft and ring retainer 64 press-fit onto the other end of the shaft abut the opposite bearing inserts 50 to limit axial movement of the shaft relative to the frame.

Also of importance to the improved shaft support means is the positive support of the eddy driven or pointer shaft 24. The opposite ends of shaft 24 are necked down to form needle bearing sections receivable in spaced bearings. The inner end of shaft 20 provides a cutout 70 into which is positioned a bearing element 72 having an opening adapted to receive the one bearing section of the shaft 24. The opposite end of the shaft 24 is received in bearing element 76 (FIG. 3) having a similar receiving opening 78. The external periphery of the bearing section 76 is thread as at 80 for connection to the front plate 16 within a threaded opening therein. A lock nut 82 maintains the bearing section 76 in proper axial adjustment to permit limited axial movement of the shaft 24 without excessive binding against the bearings.

The bearing structure 76 in addition to having the receiving opening 78 has an enlarged concentric opening 84 which surrounds with clearance the shaft 24 to define an annular cavity around the shaft. A damping cup 88 (FIG. 4), secured to the shaft 24, has side walls 90 larger than the outer dimension of the bearing 76 and is receivable over the threads. The bearing section 76 and the cup-shaped member 88 are spaced, but, facing one another, define together an annular cavity 92 surrounding the shaft 24.

The cavity 92 is filled during assembly with a silicone fluid such as the Dow Chemical 200 series. The silicone, particularly in the 200 series, is of generally constant viscosity over a wide range of temperature, and is inert in nature to neither react with the bearing material, shaft or the like, nor deteriorate or decay in time. The silicone through its viscous friction between the shaft 24 and bearing 76, and between the bearing 76 and cup 88 resists rotation of the shaft relative to the frame. However, the torque drag on the shaft can be varied as required by merely varying, for instance, the axial length of the cavities, radial clearances, or the overlap of the damping cup 88 on the bearing 76. A properly adjusted torque drag between the shaft and the frame dampens out pointer oscillation without hindering the accuracy of the eddy current instrument.

It has been found that with the bearing units of plastic the fatigue life of the assembly is greatly increased. Thus, bearing unit 76 is of Delrin, which has a low coefficient of friction, excellent impact qualities and resists deformation under load. Nylafil, a glass filled nylon, is preferred for the bearing inserts 50, having low deformation under load, a low coefficient of linear expansion, and wearing qualities comparable with nylon.

It is thus seen that the disclosed shaft support and damping construction provide an eddy current instrument of long service life requiring little or no maintenance. Lubrication of the high wear bearings is provided by the large supply of lubricant in the chamber 56. The deformable plastic bearings of the respective shafts increase the fatigue life against vibration, while maintaining the cost and friction of the bearings relatively low. The improved damping means not only increases the fatigue life of the assembly but also permits non-oscillatory pointer action for accurate pointer readings.

While only a single embodiment has been disclosed it will be apparent that slight variations can be made therein without departing from the scope of this invention. Accordingly, it is desired that the invention be limited only by the claims hereinafter following.

What is claimed is:

1. In an eddy current instrument, the combination comprising, a frame, a first shaft, spaced annular bearing inserts of plastic material received over the shaft supported by the frame to support the shaft for rotation relative to the frame, said bearing inserts being spaced apart at their adjacent ends to define therebetween adjacent the shaft an annular reservoir for holding a lubricant for lubricating the first shaft, a second shaft, spaced bearing elements adapted to support the second shaft for rotation relative to the frame, complementary eddy elements supported nonrotatably on the first and second shafts, respectively, operable to rotate therewith and to form an eddy torque transmission link between the shafts, and viscous damping means between the frame and the second shaft operable to dampen oscillation of the second shaft relative to the frame, said viscous damping means including one of the bearing elements for the second shaft being of plastic fabricated to a cup-shaped contour having its side walls extended over but spaced from the second shaft annularly thereof, a cup-shaped member secured to the second shaft and having its side walls in telescoping relationship with but spaced from the side walls of the one bearing element, and a viscous silicone fluid filling the annular chamber between the overlapping side walls.

2. In an eddy current instrument, the combination comprising, a frame having a through-bore, a first shaft freely receivable within the bore, spaced bearing inserts positioned over the shaft and into the opposite ends of the bore to support the shaft for rotation relative to the frame, said bearing inserts being spaced apart at their adjacent ends to define therebetween an annular reservoir adjacent the shaft adapted to hold a lubricant for lubricating the first shaft, a second shaft, bearing means adapted to support the second shaft for rotation relative to the frame, complementary eddy elements supported non-rotatably on the first and second shafts, respectively, operable to rotate therewith and to form an eddy torque transmission link between the shafts, a return spring connected between the frame and the second shaft resisting rotation of the second shaft, viscous damping means between the frame and the second shaft operable to dampen oscillation of the second shaft relative to the frame, said viscous damping means including a portion of one of the bearing means for the second shaft being cup-shaped having its inner part extended over but spaced from the second shaft, a cup-shaped member secured to the second shaft having wall structure extended over but spaced from the outer part of the one bearing means and defining therewith an annular chamber around the second shaft, and a viscous silicone fluid filling the annular chamber effective to provide a generally low torque drag between the second shaft and the frame.

3. In an eddy current instrument, the combination comprising a frame having a through-bore, a first shaft freely receivable within the bore, spaced annular bearing inserts received over the shaft and into the opposite ends of the bore adapted to support the shaft for rotation relative to the frame, said bearing inserts being spaced apart at their adjacent ends and defining therebetween and between the shaft and the periphery of the bore an annular reservoir for a lubricant for the first shaft, a second shaft, spaced bearing elements on the frame and on the inner end of the first shaft, respectively, adapted to support the second shaft for rotation about its longitudinal center axis, complementary eddy elements supported nonrotatably on the first and second shafts, respectively, operable to rotate therewith and to form a slip-type transmission link between the shafts, so that rotation of the first shaft tends to bias the second shaft in a corresponding direction with a determinable torque, a return spring connected between the frame and the second shaft operable to resist rotation of the second shaft, and a viscous damping means operable to dampen oscillation of the second shaft relative to the frame, said viscous damping means including the bearing element for the second shaft on the frame having a portion extended over and spaced from the shaft annularly thereof and defining an annular cavity therebetween, a disc-like member secured to the second shaft adjacent but spaced from the frame bearing element to substantially close said annular cavity, and a viscous silicone fluid filling the annular cavity and having internal friction effective to establish a generally low torque drag between the confining members.

4. In an eddy current instrument, the combination comprising a frame having a through-bore, a first shaft freely receivable within the bore, spaced annular bearing inserts of plastic material received over the shaft into the opposite ends of the bore to support the shaft for rotation relative to the frame, said bearing inserts being spaced apart at their adjacent ends to define therebetween and between the shaft and the periphery of the bore an annular reservoir for holding a lubricant for lubricating the first shaft, a second shaft, spaced bearing elements adapted to support the second shaft for rotation relative to the frame, complementary eddy elements supported nonrotatably on the first and second shafts, respectively, operable to rotate therewith and to form a slip-type tranmission link betwen the shafts, and viscous damping means between the frame and the second shaft operable to dampen oscillation of the second shaft relative to the frame, said viscous damping means including one of the bearing elements for the second shaft being of a plastic material fabricated to a cup-shaped contour having its side walls extended over but spaced from the second shaft annularly thereof, a member secured to the second shaft and having its side walls extended over and spaced from the side walls of the one bearing element to define therewith an annular chamber around the shaft, and a viscous silicone fluid filling the annular chamber and contacting the second shaft and the frame through the bearing element.

5. In an eddy current instrument having complementary eddy elements supported on separate shafts, and having one of the shafts externally rotated effective to bias the other of the shafts in the similar direction and with a torque generally proportionate with speed, an improved bearing and damping support for the biased shaft, comprising spaced bearing elements on the instrument frame adapted to support the shaft for rotation about its longitudinal center axis, and viscous damping means between the frame and the shaft operable to dampen oscillation of the shaft relative to the frame, said viscous damping means including one of the bearing elements for the shaft being cup-shaped and having its side walls extended over but spaced from the shaft annularly thereof, a cup-shaped member secured to the shaft having its side walls extended over and spaced from the side walls of the one bearing element, and defining therebetween and between the shaft an annular chamber around the shaft, and a viscous silicone fluid filling the annular chamber effective to cause a generally low torque drag between the shaft and the frame.

6. For use with a round shaft carrying a speed cup for rotation from a bias position to any one of a plurality of other positions dependent on the speed of rotation of a permanent magnet rotatably associated with said speed cup, the improvement comprising fixed means rotatably supporting said speed cup shaft, a first annular wall surface on said means spaced from said shaft and extending axially along said shaft, and a second annular wall carried by said shaft concentric with and spaced from said first wall and cooperating with said first wall solely for retaining a damping fluid deposited between said means rotatably supporting said shaft and the shaft without any additional retaining means.

7. A combination for damping extraneous vibrations of a round speed cup shaft rotatably journalled at one end in another shaft carrying a rotatable magnet for continually rotating said speed cup shaft, the improvement comprising a bearing for rotatably supporting the other end of said speed cup shaft, a viscous damping fluid deposited between said shaft and bearing, and spaced apart means carried by said bearing and said speed cup shaft respectively for solely retaining said viscous damping fluid between said bearing and said speed cup shaft, without any other structure between said spaced apart means and round shaft whereby said fluid is adapted to provide a linearly varying resistance only to the rotation of said shaft.

References Cited by the Examiner

UNITED STATES PATENTS

| 1,461,628 | 7/23 | Patrick | 73—519 |
| 1,857,674 | 5/32 | Zubaty | 73—520 |
| 2,073,153 | 3/37 | Helgeby | 73—519 |
| 2,224,954 | 12/40 | Eisele | 73—520 |
| 2,518,928 | 8/50 | Paine | 73—430 |
| 2,569,311 | 9/51 | Hoare et al. | 324—125 X |
| 2,926,898 | 3/60 | Taylor | 73—430 |
| 3,018,146 | 1/62 | Euwe | 308—238 |
| 3,022,128 | 2/62 | Reuter | 308—238 |
| 3,130,991 | 4/64 | Piragino | 308—238 |

FOREIGN PATENTS 857,785  1/61  Great Britain.

RICHARD C. QUEISSER, *Primary Examiner.*

JAMES J. GILL, *Examiner.*